(12) United States Patent
Hirabayashi (10) Patent No.: US 8,282,294 B2
(45) Date of Patent: Oct. 9, 2012

(54) BARRIER UNIT

(75) Inventor: Koichiro Hirabayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 146 days.

(21) Appl. No.: 12/918,347

(22) PCT Filed: Feb. 23, 2009

(86) PCT No.: PCT/JP2009/000759
§ 371 (c)(1),
(2), (4) Date: Aug. 19, 2010

(87) PCT Pub. No.: WO2009/104422
PCT Pub. Date: Aug. 27, 2009

(65) Prior Publication Data
US 2010/0329663 A1 Dec. 30, 2010

(30) Foreign Application Priority Data

Feb. 21, 2008 (JP) .................. 2008-039651

(51) Int. Cl.
*G03B 17/00* (2006.01)
(52) U.S. Cl. ..................................... 396/448
(58) Field of Classification Search .................. 396/448
See application file for complete search history.

(56) References Cited

U.S. PATENT DOCUMENTS

| 4,227,792 | A | * | 10/1980 | Rentschler ................. 396/460 |
| 7,210,795 | B2 | * | 5/2007 | Hara et al ..................... 353/88 |
| 2001/0043542 | A1 | | 11/2001 | Omori et al. |
| 2002/0172519 | A1 | * | 11/2002 | Takahashi et al. ........... 396/486 |

FOREIGN PATENT DOCUMENTS

| JP | 5-002130 | 1/1993 |
| JP | 05-027302 | 2/1993 |
| JP | 09-061887 | 3/1997 |
| JP | 10-196200 | 7/1998 |
| JP | 2002-258378 | 9/2002 |
| JP | 2006-126552 | 5/2006 |
| JP | 2006-284641 | 10/2006 |
| JP | 2007-248665 | 9/2007 |

OTHER PUBLICATIONS

International Search Report for corresponding International Application No. PCT/JP2009/000759 mailed May 19, 2009.
Form PCT/ISA/237 and a partial English translation for corresponding Application No. PCT/JP2009/000759 mailed May 19, 2009.

* cited by examiner

*Primary Examiner* — Clayton E Laballe
*Assistant Examiner* — Dennis Hancock
(74) *Attorney, Agent, or Firm* — Renner, Otto, Boisselle & Sklar, LLP (57) ABSTRACT

The present invention provides a barrier unit structure that can avoid not only ruining the appearance of a barrier unit due to a vertical misfit of blades that contact with each other at their edges when closed but also interfering with smooth movement of the blades due to their unintentional overlap.
The barrier unit includes: a base, which defines a first window; a cap, which defines a second window and which is arranged so that the second window faces the first window; and a number of blades, which are arranged between the base and the cap so as to open or close with respect to the first and second windows. In a space between the base and the cap, clearance e left in the vicinity of a first position, where the blades contact with each other at their edges when closed, is smaller than clearance d left at a second position, which is different from the first position.

13 Claims, 7 Drawing Sheets

BARRIER UNIT

TECHNICAL FIELD

The present invention relates to a barrier unit to be opened and closed in front of the lens of a still camera or a video movie camera to protect that lens.

BACKGROUND ART

Figure 9:
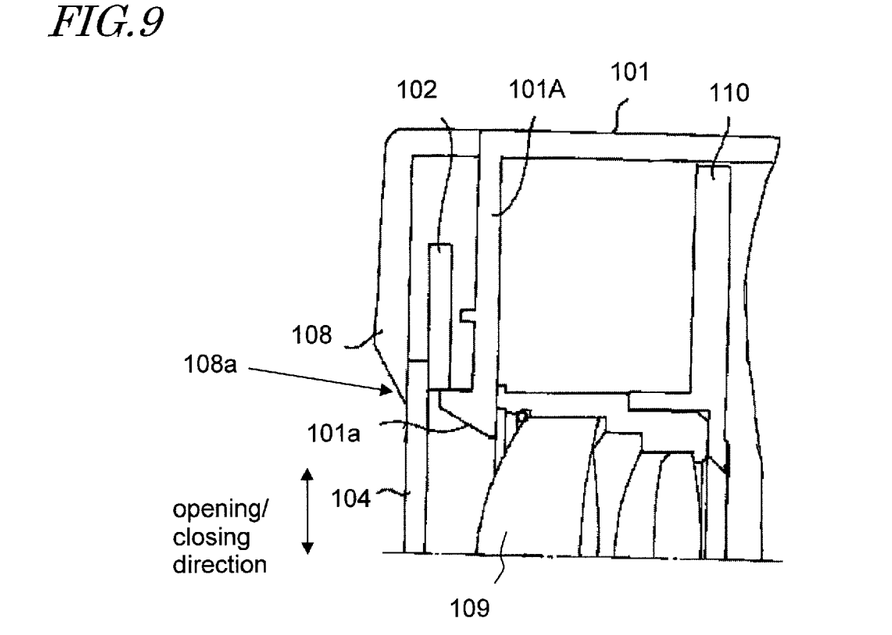
FIG. 9 is a cross-sectional view illustrating a conventional barrier unit 101.

Patent Document No. 1 discloses a conventional barrier unit. FIG. 9 is a cross-sectional view illustrating a barrier unit 101 as disclosed in Patent Document No. 1.

At the center of a frontend plate portion 101A, there is a window 101a that makes an optical path with respect to a lens 109. A set of barrier blades 104, which is arranged in front of the frontend plate portion 101A, opens and closes the window 101a. When the barrier blades 104 are open, a shutter opens and closes on a shutter plate 110, thereby getting shooting done.

In this barrier unit 101, when the barrier blades 104 are fully opened or closed, a barrier blade drive ring 102 protrudes toward the direction from which light is coming, thereby pressing the barrier blades 104 against a barrier protective cap 108. As a result, sand or any other foreign matter will not easily enter the gap between the barrier blades 104 and the barrier protective cap 108.

Hereinafter, a typical conventional barrier unit will be described with reference to FIGS. 10 through 14.

Figure 10:
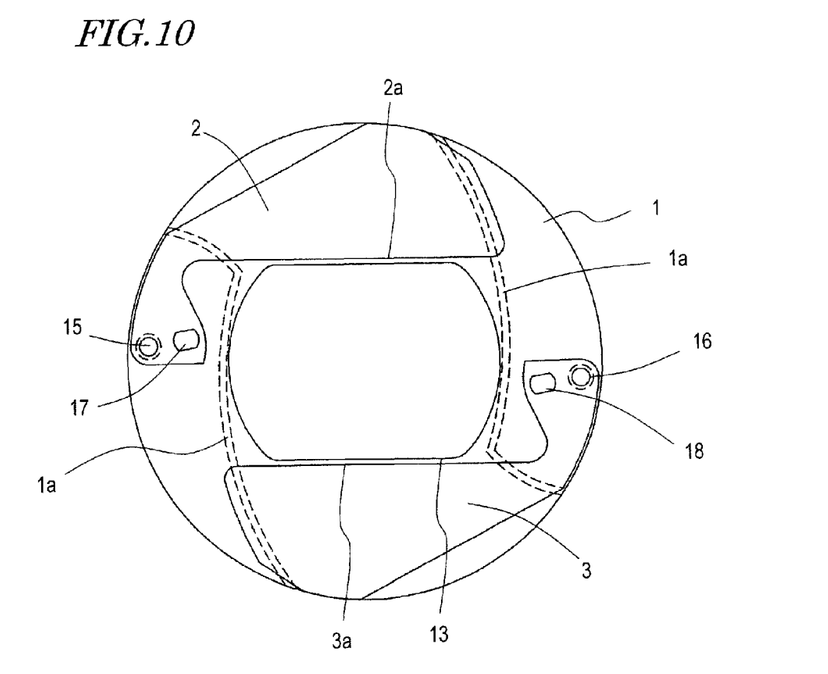
FIG. 10 is a plan view illustrating a situation where first and second blades 2 and 3 are opened.
Figure 11:
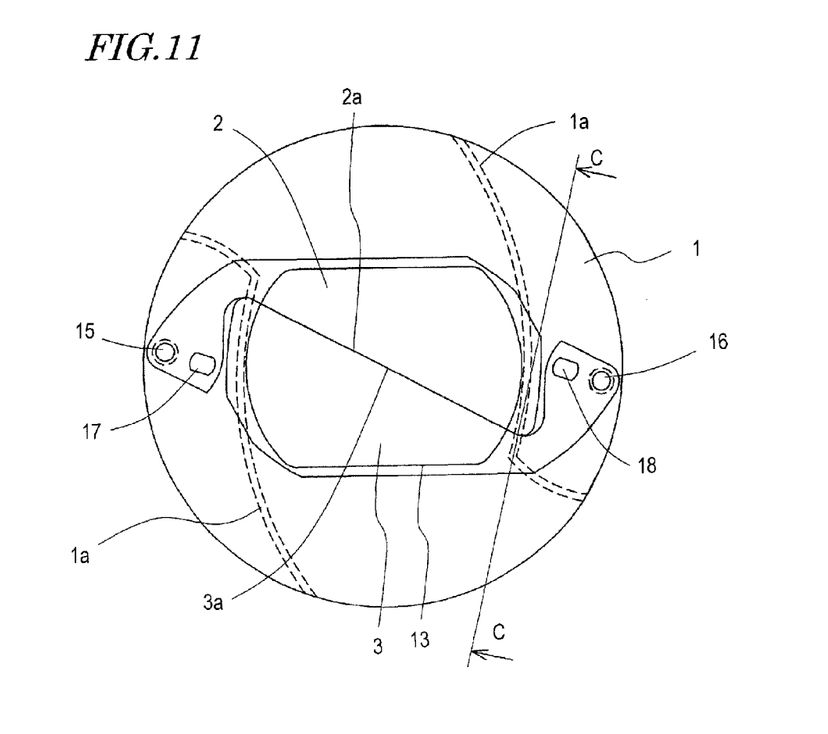
FIG. 11 is a plan view illustrating a situation where the first and second blades 2 and 3 are closed.

FIG. 10 is a plan view illustrating a situation where first and second blades 2 and 3 are opened, while FIG. 11 is a plan view illustrating a situation where the first and second blades 2 and 3 are closed. In FIGS. 10 and 11, the first and second blades 2 and 3 are shown in a simplified form.

The first blade 2 has a pivot hole 15 and an elongate hole 17, while the second blade 3 has a pivot hole 16 and an elongate hole 18. The first and second blades 2 and 3 are driven at the elongate holes 17 and 18 so as to pivot around the pivot holes 15 and 16, respectively. When opening or closing, the first and second blades 2 and 3 are guided on blade guide rail portions 1a of the cap 1 and on blade guide rail portions on a base as will be described later. When the first and second blades 2 and 3 are closed, the first and second edges 2a and 3a of the first and second blades 2a and 3a are preferably in contact with each other without overlapping with each other.

Hereinafter, it will be described, with reference to cross-sectional views as viewed on the plane C-C shown in FIG. 11, what may happen when the first and second blades 2 and 3 are closed.

Figure 12:
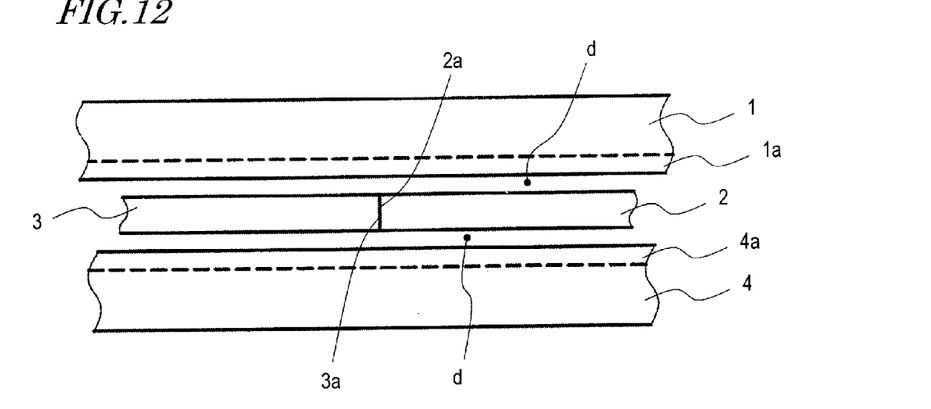
FIG. 12 illustrates a situation where the first and second blades 2 and 3 with ideal planar surfaces are closed right in their intended positions.
Figure 13:
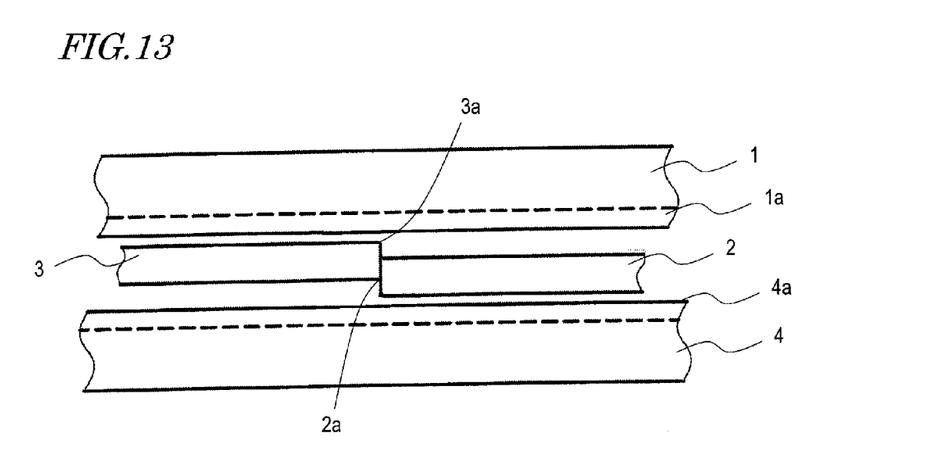
FIG. 13 illustrates a situation where the first and second blades 2 and 3 with ideal planar surfaces are closed but have failed to perfectly fit with each other vertically.
Figure 14:
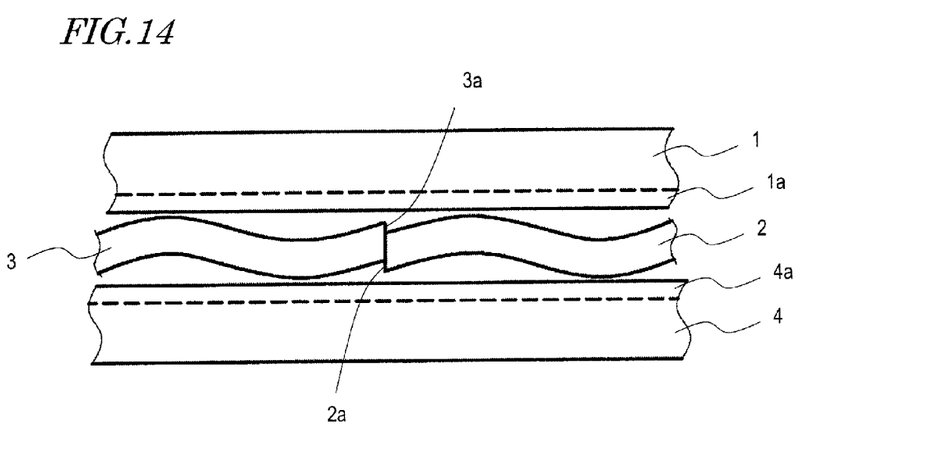
FIG. 14 illustrates a situation where the first and second blades 2 and 3 with a low degree of planarity are closed.

FIGS. 12 to 14 are cross-sectional views illustrating, as viewed on the plane C-C, the relative positions of the first and second blades 2 and 3 in mutually different states.

Specifically, FIG. 12 illustrates a situation where the first and second blades 2 and 3 with ideal planar surfaces are closed right in their intended positions. In FIG. 12, when opening or closing, the first and second blades 2 and 3 are guided along the blade guide rail portions 1a on the cap 1 and along the blade guide rail portions 4a on the base 4. To open and close these blades just as intended, some clearance d is left between the first and second blades 2, 3 and the blade guide rail portions 1a and 4a.

In the example illustrated in FIG. 12, the first and second blades 2 and 3 are substantially level with each other and closed without imperfectly fitting with each other vertically in the drawing. As used herein, "vertically" means perpendicularly to the cap 1 and the base 4.

On the other hand, FIG. 13 illustrates a situation where the first and second blades 2 and 3 with ideal planar surfaces are closed but have failed to perfectly fit with each other vertically. And FIG. 14 illustrates a situation where the first and second blades 2 and 3 with a low degree of planarity are closed. As used herein, the "low degree of planarity" refers to non-planar first and second blades 2 and 3, which may be wavy or curved as shown in FIG. 14, for example.

Patent Document No. 1: Japanese Patent Application Laid-Open Publication No. 9-61887

DISCLOSURE OF INVENTION

Problems to be Solved by the Invention

In the conventional arrangement, if the clearance d shown in FIG. 12 were too wide, the first and second edges 2a and 3a of the first and second blades 2 and 3 would fail to fit with each other vertically as shown in FIG. 13, thus ruining its appearance. Particularly if the level difference between those blades were significant, then the first and second blades 2 and 3 in the closed position would overlap with each other at those edges. As a result, the blades could not be opened or closed smoothly.

Nevertheless, if the clearance d left were insufficient, blades with a low degree of planarity would not be allowed a space to open or close smoothly as shown in FIG. 14 when a barrier unit is assembled using such blades. Consequently, those blades would not work fine, either.

It is therefore an object of the present invention to provide a structure that contributes to avoiding not only ruining the appearance of a barrier unit due to such a vertical misfit of the blades that contact with each other at the edges when closed but also interfering with smooth movement of the blades due to their unintentional overlap. Another object of the present invention to provide a structure that contributes to preventing blades with a low degree of planarity from working badly even when a barrier unit is assembled using such blades.

Means for Solving the Problems

A barrier unit according to the present invention is designed to protect the lens of an image capture device. The unit includes: a base, which defines a first window; a cap, which defines a second window and which is arranged so that the second window faces the first window; and a number of blades, which are arranged between the base and the cap so as to open or close with respect to the first and second windows. In a space between the base and the cap, clearance e left in the vicinity of a first position, where the blades contact with each other at their edges when closed, is smaller than clearance d left at a second position, which is different from the first position.

Each of the base and the cap may have a rail for guiding at least one of the blades that is going to open or close. Each said rail may guide the opening or closing blade with a predetermined clearance left between the blade and the rail itself. The clearances e and d may be provided between the respective rails on the base and on the cap.

The cap may have a rail for guiding at least one of the blades that is going to open or close. The clearances e and d may be provided between the base and the rail.

Alternatively, the base may have a rail for guiding at least one of the blades that is going to open or close, and the clearances e and d may be provided between the cap and the rail.

In the vicinity of the first position, one of the base and the cap may have a regulating portion that protrudes toward the blades.

The clearance e may be provided between the regulating portion of one of the base and the cap and the other with no regulating portion.

In the vicinity of the first position, each of the base and the cap may have a regulating portion that protrudes toward the blades.

The clearance e may be provided between the respective regulating portions of the base and the cap.

The regulating portions may be sloped at their ends.

Another barrier unit according to the present invention is also designed to protect the lens of an image capture device. The unit includes: a base, which defines a first window; a cap, which defines a second window and which is arranged so that the second window faces the first window; and a number of blades, which are arranged between the base and the cap so as to open or close with respect to the first and second windows. In a space between the base and the cap, clearance e left in the vicinity of a first position, where the blades contact with each other at their edges when closed, is smaller than clearance d left at a second position, where the blades are open more widely with respect to the first and second windows than at the first position.

A camera according to the present invention includes a barrier unit according to any of the preferred embodiments of the present invention described above.

Effects of the Invention

In the barrier unit of the present invention, blade guide rail portions provided for first and second blades have an increased thickness in the vicinity of a position where the first and second blades closed contact with each other, thereby leaving a smaller clearance between the blades and the blades guide rail portions near that position where the closed blades contact with each other. In this manner, the present invention provides a barrier unit, which can avoid not only getting its appearance ruined by a vertical misfit of the blades in contact with each other but also working badly owing to an unintentional overlap of the blades and of which the blades never fail to work fine even if the unit is assembled with blades with a low degree of planarity.

DESCRIPTION OF REFERENCE NUMERALS 1 cap
2 first blade
3 second blade
4 base
2a, 3a blade edge
1a, 4a blade guide rail portion
1b, 4b, 1b-1, 1b-2, 4b-1 and 4b-2 blade guide rail's regulating portion
1c, 4c sloped portion

BEST MODE FOR CARRYING OUT THE INVENTION

Hereinafter, preferred embodiments of a barrier unit according to the present invention will be described with reference to FIGS. 1 through 7 of the accompanying drawings.

Figure 1:
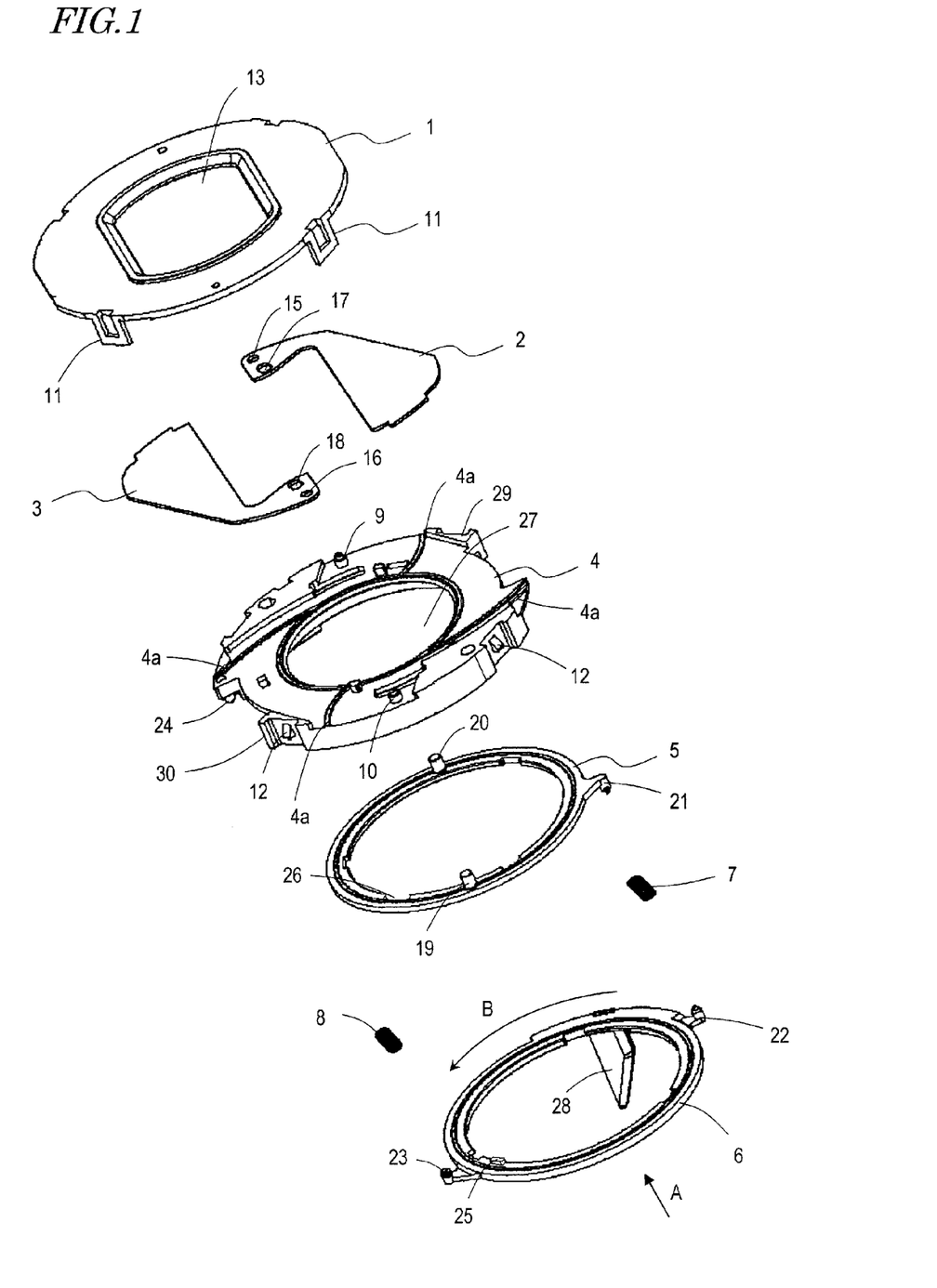
FIG. 1 is an exploded perspective view illustrating the upside of respective members of a barrier unit as a preferred embodiment of the present invention.
Figure 2:
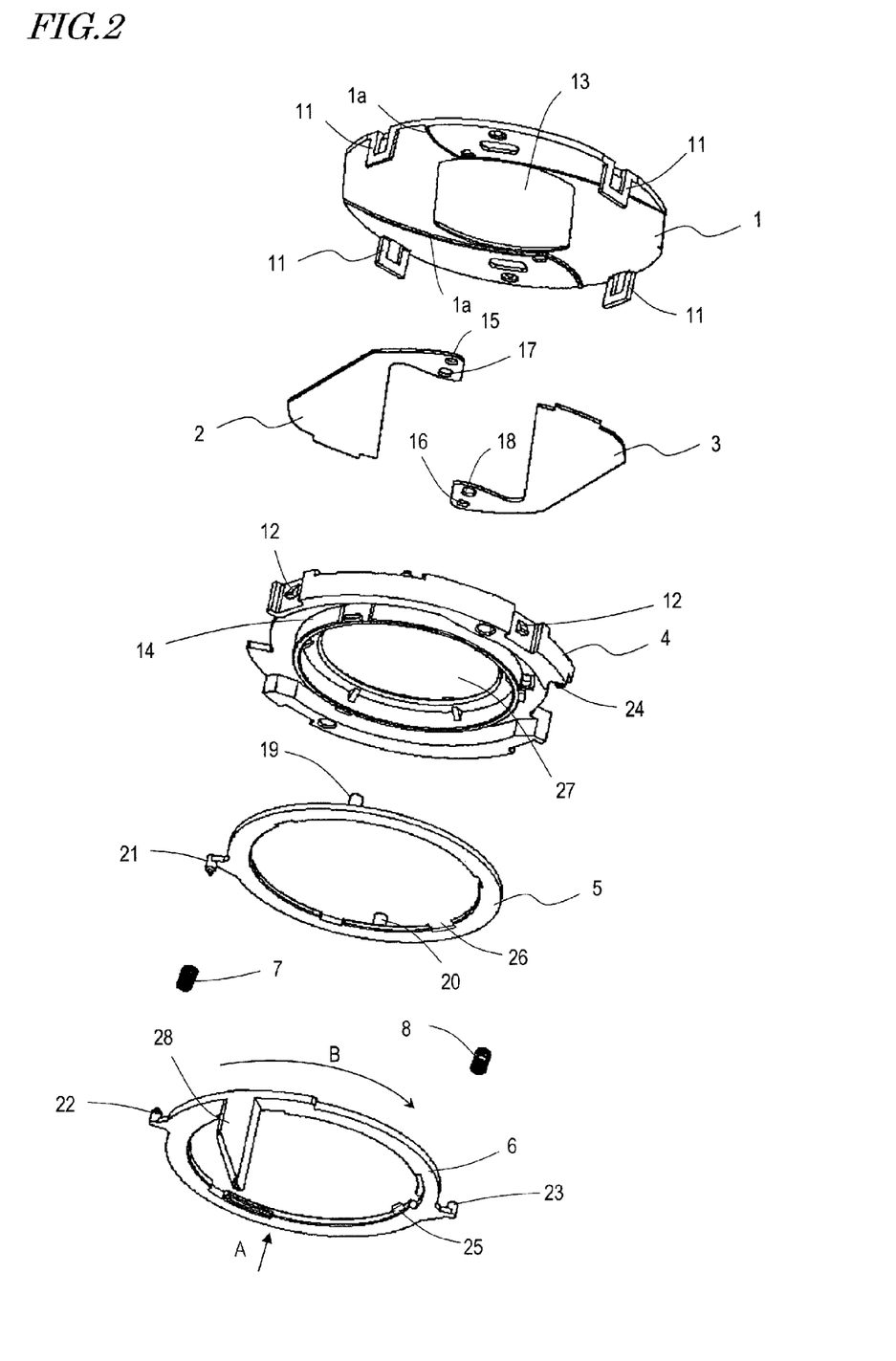
FIG. 2 is an exploded perspective view illustrating the downside of those members of the barrier unit of the preferred embodiment of the present invention.

FIGS. 1 and 2 are exploded perspective views respectively illustrating the upside and downside of respective members of a barrier unit as a preferred embodiment of the present invention.

The barrier unit includes a cap 1, first and second blades 2 and 3 with first and second edges 2a and 3a, a base 4, first and second rings 5 and 6, and first and second springs 7 and 8.

The first and second blades 2 and 3 are provided to protect the lens of a camera when the barrier unit 50 is attached to the camera. When the user performs shooting using the camera, the first and second blades 2 and 3 are opened. Otherwise (e.g., when the camera is turned OFF), the first and second blades 2 and 3 are closed.

The first and second blades 2 and 3 are pivoted to the base 4 by fitting pivots 9 and 10 on the base 4 into pivot holes 15 and 16, respectively. By getting hooks 11, which are elastic members that form integral parts of the cap 1, engaged with hook stoppers 12 of the base 4, the cap 1 is fit to the base 4 so as to sandwich the first and second blades 2 and 3 between them and to leave a predetermined clearance that is wide enough to let those blades 2 and 3 turn freely there.

The cap 1 has blade guide rail portions 1a (see FIG. 2). On the other hand, the base 4 has blade guide rail portions 4a (see FIG. 1).

The cap 1 has a window 13. The first and second rings 5 and 6 are fit rotatably to the cylindrical portion 14 of the base 4. The cam pins 19 and 20 of the first ring 5 are engaged into elongate holes 17 and 18 of the first and second blades to turn the blades.

The first spring 7 is extended between respective spring hooks 21 and 22 of the first and second rings 5 and 6. Likewise, the second spring 8 is extended between respective spring hooks 23 and 24 of the second ring 6 and the base 4.

The second ring 6 has a ring projection 25, which is fit into a notched portion 26 of the first ring 5, thereby assembling the first and second rings 5 and 6 together.

The base 4 also has a window 27.

The second ring 6 has a cam portion 28 which is biased by driving means (not shown), and is driven to the direction in which the first and second blades 2 and 3 close as indicated by the arrow B.

The first and second rings 5 and 6 are combined together with the first spring 7. As the second ring 6 is driven in the closing direction (as indicated by the arrow B) by the cam portion 28, the first and second blades 2 and 3 are closed. And even if the second ring 6 can afford to further turn in the same closing direction after that, the first spring 7 expands to prevent the second ring 6 from going too far with respect to the first ring 5.

Figure 3:
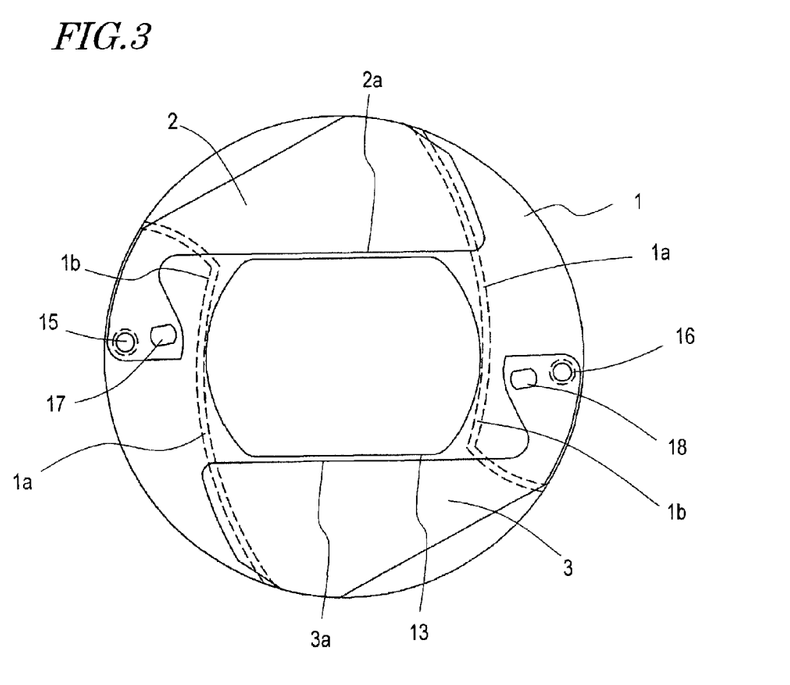
FIG. 3 is a plan view illustrating a situation where first and second blades 2 and 3 are opened.
Figure 4:
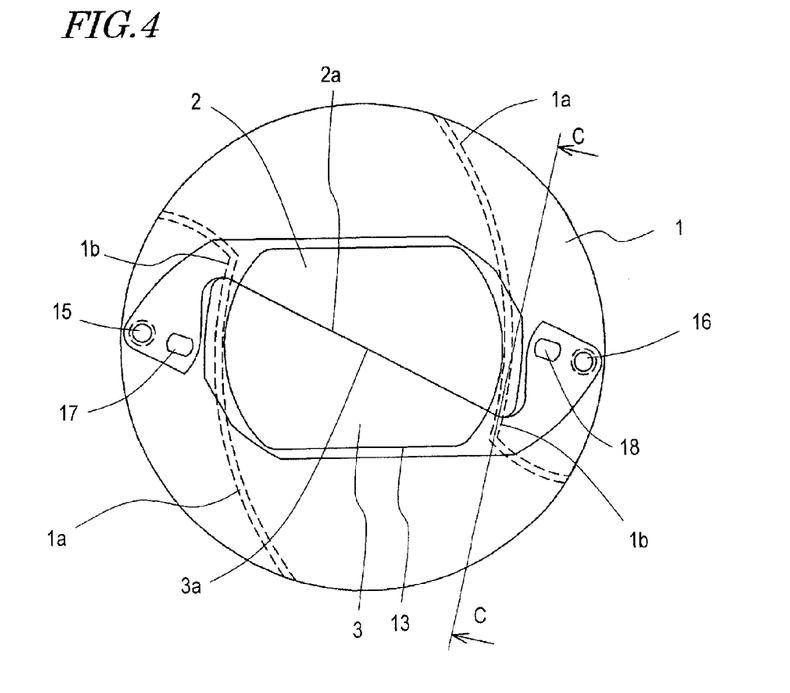
FIG. 4 is a plan view illustrating a situation where the first and second blades 2 and 3 are closed.

FIG. 3 is a plan view illustrating a situation where first and second blades 2 and 3 are opened, while FIG. 4 is a plan view illustrating a situation where the first and second blades 2 and 3 are closed. In FIGS. 3 and 4, only the cap 1 and the first and second blades 2 and 3 are shown in a simplified form.

The first and second blades 2 and 3 are driven at the elongate holes 17 and 18 so as to pivot around the pivot holes 15 and 16, respectively. As shown in FIG. 4, when the blades are closed, the first and second edges 2a and 3a are in contact with each other.

The barrier unit of this preferred embodiment is partly characterized by providing a regulating portion 1b for the blade guide rail portions 1a and a regulating portion 4b for the blade guide rail portions 4a. These regulating portions 1b and 4b are arranged in the vicinity of a position where the first and second edges 2a and 3a contact with each other so as to protrude toward the blades.

Hereinafter, the structure of the barrier unit of this preferred embodiment will be described in detail with reference to FIGS. 5 to 7, which are cross-sectional views as viewed on the plane C-C.

Figure 5:
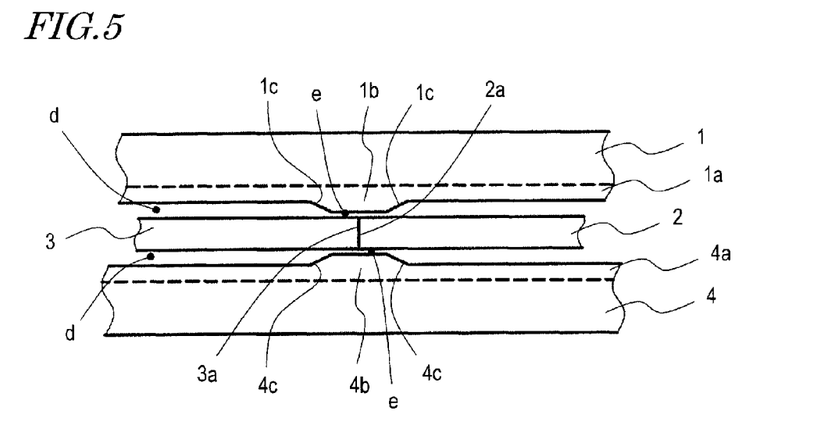
FIG. 5 illustrates a situation where the first and second blades 2 and 3 with ideal planar surfaces are closed right in their intended positions.
Figure 6:
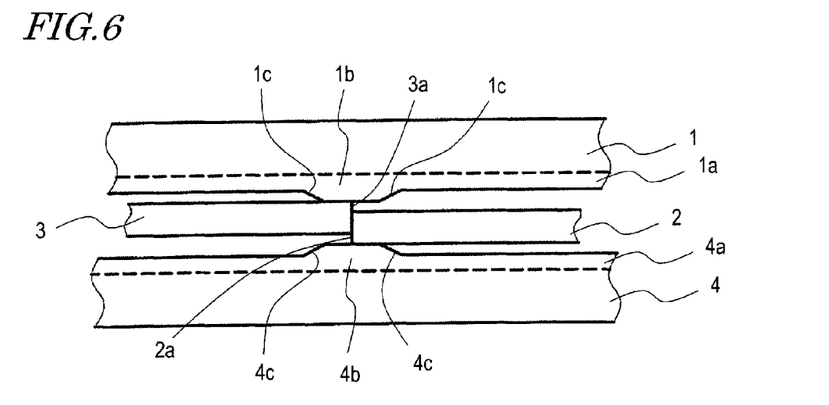
FIG. 6 illustrates a situation where the first and second blades 2 and 3 with ideal planar surfaces are closed but have imperfectly fit with each other vertically.
Figure 7:
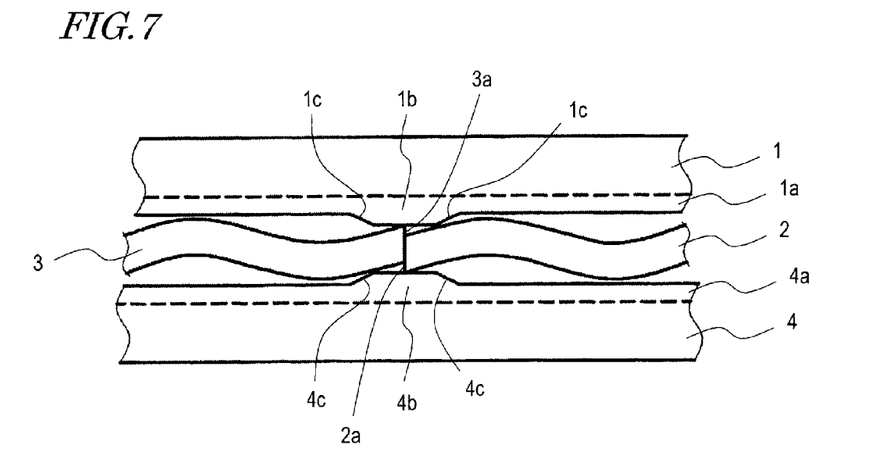
FIG. 7 illustrates a situation where the first and second blades 2 and 3 with a low degree of planarity are closed.

FIGS. 5 to 7 are cross-sectional views illustrating, as viewed on the plane C-C, the relative positions of the first and second blades 2 and 3 in mutually different states.

In FIGS. 5 to 7, the first and second blades 2 and 3 that are going to open or close are guided by the blade guide rail portions 1a on the cap 1 and by the blade guide rail portions 4a on the base 4.

To open and close these blades just as intended, some clearance d is left between the first and second blades 2, 3 and the blade guide rail portions 1a and 4a. In the vicinity of a position where the blade edges 2a and 3a contact with each other, provided are regulating portions 1b and 4b for the blade guide rail portions. Specifically, the regulating portion 1b is provided for the blade guide rail portions 1a of the cap 1, while the regulating portion 4b is provided for the blade guide rail portions 4b of the base 4.

With the regulating portions 1b and 4b provided for the blade guide rail portions, the clearance between the blade edge 2a and the cap 1 and the clearance between the blade edge 3a and the base 4 (which are both identified by "e" in FIG. 5) are both smaller than the normal clearance d in the vicinity of the position where the blade edges 2a and 3a contact with each other. And the blade guide rail regulating portions 1b and 4b are sloped at both of their ends 1c and 4c.

Supposing the thicknesses of the first and second blades 2 and 3 are both identified by t, the space between the two regulating portions 1b and 4b is defined to be greater than t but less than 2t.

FIG. 5 illustrates a situation where the first and second blades 2 and 3 with ideal planar surfaces are closed right in their intended positions. In such a situation, the regulating portions 1b and 4b for the blade guide rail portions 1a and 4a do not function. These regulating portions 1b and 4b, however, work particularly effectively in the situations illustrated in FIGS. 6 and 7.

FIG. 6 illustrates a situation where the first and second blades 2 and 3 with ideal planar surfaces are closed but have imperfectly fit with each other vertically. And FIG. 7 illustrates a situation where the first and second blades 2 and 3 with a low degree of planarity are closed.

As shown in FIG. 6, even if the first and second blades 2 and 3 have imperfectly fit with each other vertically, the magnitude of misfit (i.e., the level difference) between the first and second blades 2 and 3 never exceeds a predetermined value because the regulating portions 1b and 4b are provided for the blade guide rail portions. More specifically, the magnitude of misfit never exceeds the space between these regulating portions 1b and 4b. Since the magnitude of misfit is minimized, the appearance of the barrier unit is not marred. On top of that, even when the blades are closed, the first and second blades 2 and 3 never overlap with each other at their edges 2a and 3a to interfere with opening or closing of the blades, either.

Furthermore, even if the barrier unit is assembled using blades with a low degree of planarity as shown in FIG. 7, the blades never fail to open or close smoothly. The reason is that the regulating portions 1b and 4b are arranged only in the vicinity of the contact portions between the blade edges 2a and 3a and that sufficiently wide clearances d are left elsewhere between the first blade 2 and the blade guide rail portions 1a, 4a and between the second blade 3 and the blade guide rail portions 1a, 4a. Also, even while the blades are opening or closing, the sloped portions 1c and 4c at the ends of the blade guide rail regulating portions 1b and 4b keep the blade edges 2a and 3a from getting caught by the regulating portions 1b and 4b.

In the preferred embodiment described above, the blade guide rail portions 1a and 4a are supposed to be provided for both of the cap 1 and the base 4. However, the blade guide rail portions may be provided for only one of the cap 1 and the base 4. Likewise, although the regulating portions 1b and 4b are supposed to be provided for both of the blade guide rail portions 1a and 4a of the cap 1 and the base 4 in the preferred embodiment described above, the regulating portion may be provided for only the blade guide rail portions of either the cap 1 or the base 4. Furthermore, the regulating portions 1b and 4b are supposed to be arranged over the blade guide rail portions in the preferred embodiment described above, but may also be arranged directly on the surface of the cap 1 or the base 4 that is opposed to the blades.

Furthermore, in the preferred embodiment described above, only one regulating portion is supposed to be provided for each of the cap 1 and the base 4b. However, multiple regulating portions may be provided for either or both of the cap 1 and the base 4.

Figure 8:
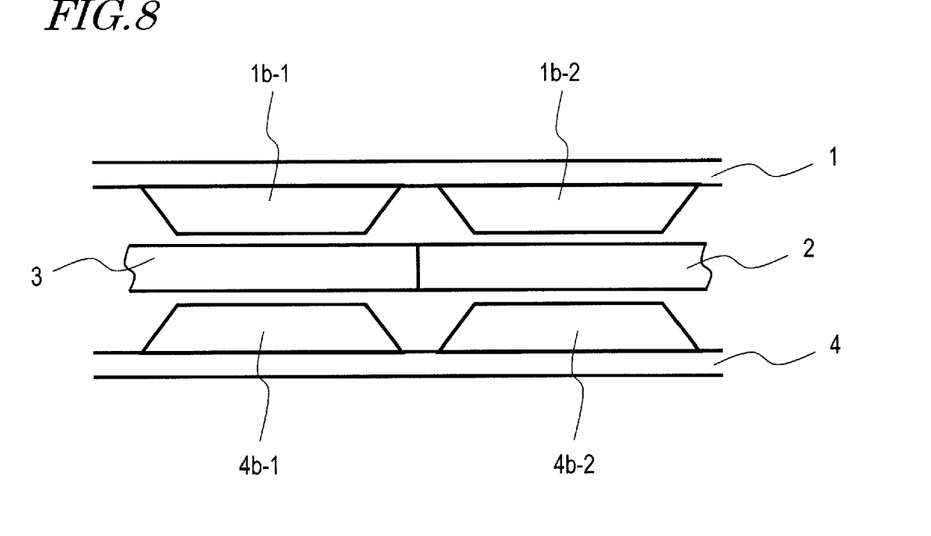
FIG. 8 illustrates an example in which two regulating portions 1b-1 and 1b-2 are provided for the cap 1 and two more regulating portions 4b-1 and 4b-2 are provided for the base 4b.

FIG. 8 illustrates an example in which two regulating portions 1b-1 and 1b-2 are provided for the cap 1 and two more regulating portions 4b-1 and 4b-2 are provided for the base 4b. In the vicinity of the contact portions between the first and second blades 2 and 3, the regulating portions 1b-1 and 4b-1 are provided for the second blade 3, and the regulating portions 1b-2 and 4b-2 are provided for the second blade 2.

The magnitude of vertical misfit of the first blade 2, if any, would never exceed the space between the regulating portions 1b-2 and 4b-2. Likewise, the magnitude of vertical misfit of the second blade 3, if any, would never exceed the space between the regulating portions 1b-1 and 4b-1. As in the preferred embodiment described above, supposing the thickness of the first and second blades 2 and 3 is identified by t, for example, the space between the regulating portions 1b-1 and 4b-1 and the space between the regulating portions 1b-2 and 4b-2 may be set to be greater than t but less than 2t.

The sloped portions 1c and 4c at the ends of the blade guide rail regulating portions 1b and 4b may cover a broader range than in the examples illustrated in FIGS. 5 to 7.

It should be noted that the sloped portions do not always have to be, but should be, provided according to the present invention because the regulating portions would be even less likely to be caught with the sloped portions provided.

In the preferred embodiment described above, the number of blades to contact with each other is supposed to be two. However, three or more such blades may also be provided.

INDUSTRIAL APPLICABILITY

The barrier unit of the present invention can be used effectively to protect the lens of a still camera or a video movie camera, for example, and may be built in an image capture device such as a still camera or a video movie camera.

The invention claimed is:

1. A barrier unit for protecting the lens of an image capture device, the unit comprising:
    a base, which defines a first window;
    a cap, which defines a second window and which is arranged so that the second window faces the first window; and
    a number of blades, which are arranged between the base and the cap so as to open or close with respect to the first and second windows,
    wherein in a space between the base and the cap, clearance e left in the vicinity of a first position, where the blades contact with each other at their edges when closed, is smaller than clearance d left at a second position, which is different from the first position, and
    wherein a thickness of each of the blades is t, and the clearance e is greater than t but less than 2t.

2. The barrier unit of claim 1, wherein each of the base and the cap has a rail for guiding at least one of the blades that is going to open or close, and
    wherein each said rail guides the opening or closing blade with a predetermined clearance left between the blade and the rail itself, and
    wherein the clearances e and d are provided between the respective rails on the base and on the cap.

3. The barrier unit of claim 1, wherein the cap has a rail for guiding at least one of the blades that is going to open or close, and
    wherein the clearances e and d are provided between the base and the rail.

4. The barrier unit of claim 1, wherein the base has a rail for guiding at least one of the blades that is going to open or close, and
    wherein the clearances e and d are provided between the cap and the rail.

5. The barrier unit of claim 1, wherein in the vicinity of the first position, one of the base and the cap has a regulating portion that protrudes toward the blades.

6. The barrier unit of claim 5, wherein the clearance e is provided between the regulating portion of one of the base and the cap and the other of the base and the cap.

7. The barrier unit of claim 1, wherein in the vicinity of the first position, each of the base and the cap has a regulating portion that protrudes toward the blades.

8. The barrier unit of claim 7, wherein the clearance e is provided between the respective regulating portions of the base and the cap.

9. The barrier unit of claim 7, wherein the regulating portions are sloped at their ends.

10. A camera comprising the barrier unit of claim 1.

11. A barrier unit for protecting the lens of an image capture device, the unit comprising:
    a base, which defines a first window;
    a cap, which defines a second window and which is arranged so that the second window faces the first window; and
    a number of blades, which are arranged between the base and the cap so as to open or close with respect to the first and second windows,
    wherein in a space between the base and the cap, clearance e left in the vicinity of a first position, where the blades contact with each other at their edges when closed, is smaller than clearance d left at a second position, and
    wherein at the second position, the blades are open more widely with respect to the first and second windows than at the first position, and
    wherein a thickness of each of the blades is t, and the clearance e is greater than t but less than 2t.

12. A camera comprising the barrier unit of claim 11.

13. A barrier unit for protecting the lens of an image capture device, the unit comprising:
    a base, which defines a first window;
    a cap, which defines a second window and which is arranged so that the second window faces the first window; and
    a number of blades, which are arranged between the base and the cap so as to open or close with respect to the first and second windows,
    wherein in a space between the base and the cap, clearance e left in the vicinity of a first position, where the blades contact with each other at their edges when closed, is smaller than clearance d left at a second position, which is different from the first position, and
    wherein in the vicinity of the first position, each of the base and the cap has a regulating portion that protrudes toward the blades, and
    wherein the regulating portions are sloped at their ends.

* * * * *